US010785288B2

(12) United States Patent
Calo et al.

(10) Patent No.: US 10,785,288 B2
(45) Date of Patent: Sep. 22, 2020

(54) DEFERENTIAL SUPPORT OF REQUEST DRIVEN CLOUD SERVICES

(71) Applicant: INTERNATIONAL BUSINESS MACHINES CORPORATION, Armonk, NY (US)

(72) Inventors: Seraphin B. Calo, Cortlandt Manor, NY (US); Douglas M. Freimuth, New York, NY (US); Franck V. Le, West Palm Beach, FL (US); Erich M. Nahum, New York, NY (US); Maroun Touma, Redding, CT (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 264 days.

(21) Appl. No.: 15/439,271

(22) Filed: Feb. 22, 2017

(65) Prior Publication Data

US 2018/0241806 A1 Aug. 23, 2018

(51) Int. Cl.
*G06F 15/173* (2006.01)
*H04L 29/08* (2006.01)
(Continued)

(52) U.S. Cl.
CPC ........ *H04L 67/1004* (2013.01); *H04L 47/781* (2013.01); *H04L 67/1029* (2013.01); *H04L 67/1031* (2013.01); *H04L 69/22* (2013.01)

(58) Field of Classification Search
CPC ............. H04L 67/1004; H04L 67/1031; H04L 67/1029; H04L 69/22
See application file for complete search history.

(56) References Cited

U.S. PATENT DOCUMENTS 7,039,691 B1 5/2006 Turnidge
7,290,056 B1* 10/2007 McLaughlin, Jr. .........
H04L 43/0852
709/201

(Continued)

OTHER PUBLICATIONS

Harrison, et al., "Universal Worker Service Pattern Version 1.0." IVOA, Oct. 2011, pp. 1-27.

(Continued)

*Primary Examiner* — Razu A Miah
(74) *Attorney, Agent, or Firm* — Tutunjian & Bitetto, P.C.; Kevin Michael Jordan

(57) ABSTRACT

A method includes configuring worker services to operate in a stateless manner and providing support services that enable the worker services to operate in the stateless manner. The support services include (i) a management service for providing notifications of server removal and addition, (ii) a state maintenance service for maintaining state information in a central location, and (iii) a load balancer service for distributing requests among worker services. The method includes altering a number of servers allocated to at least one worker service, responsive to a notification from the management service. A private protocol is used between the worker services and load balancer service (a) to send, from the worker services to the load balancer service, a respective pointer to the state information associated with the requests, and (b) to include the respective pointer in the requests when any of the requests are forwarded to any worker service.

15 Claims, 7 Drawing Sheets

(51) Int. Cl.
*H04L 12/911* (2013.01)
*H04L 29/06* (2006.01)

(56) References Cited

U.S. PATENT DOCUMENTS

| | | | | |
|---|---|---|---|---|
| 7,865,614 | B2* | 1/2011 | Lu | H04L 29/06 370/503 |
| 8,607,233 | B2* | 12/2013 | Ryman | G06F 9/5027 709/223 |
| 9,032,081 | B1* | 5/2015 | North | H04L 67/1006 709/225 |
| 9,811,363 | B1 | 11/2017 | Wagner | |
| 2003/0051021 | A1* | 3/2003 | Hirschfeld | G06F 9/5077 709/223 |
| 2003/0182278 | A1* | 9/2003 | Valk | G06F 9/445 |
| 2004/0117358 | A1* | 6/2004 | von Kaenel | G06Q 40/08 |
| 2004/0268407 | A1* | 12/2004 | Sparrell | G06F 1/266 725/116 |
| 2005/0228856 | A1* | 10/2005 | Swildens | G06F 9/50 709/200 |
| 2005/0256223 | A1 | 11/2005 | Kolb et al. | |
| 2008/0195755 | A1* | 8/2008 | Lu | H04L 29/06 709/241 |
| 2009/0013029 | A1* | 1/2009 | Childress | H04L 67/1095 709/203 |
| 2009/0044264 | A1* | 2/2009 | Ramanathan | G06F 21/552 726/14 |
| 2009/0138548 | A1 | 5/2009 | Kumagai et al. | |
| 2009/0157627 | A1* | 6/2009 | Arthursson | G06F 9/45504 |
| 2009/0276771 | A1 | 11/2009 | Nickolov et al. | |
| 2011/0022812 | A1* | 1/2011 | van der Linden | G06F 9/5077 711/163 |
| 2011/0055378 | A1* | 3/2011 | Ferris | G06F 9/45558 709/224 |
| 2011/0078303 | A1* | 3/2011 | Li | H04L 67/1012 709/224 |
| 2011/0078318 | A1* | 3/2011 | Desai | G06F 9/5083 709/228 |
| 2011/0138051 | A1* | 6/2011 | Dawson | G06F 9/5072 709/226 |
| 2011/0179162 | A1* | 7/2011 | Mayo | H04L 67/02 709/224 |
| 2011/0296020 | A1 | 12/2011 | Deng et al. | |
| 2011/0299537 | A1* | 12/2011 | Saraiya | H04L 69/324 370/392 |
| 2012/0054346 | A1* | 3/2012 | Lee | H04L 41/04 709/226 |
| 2012/0096165 | A1* | 4/2012 | Madduri | G06F 9/5011 709/226 |
| 2012/0110063 | A1* | 5/2012 | Prasad | G06Q 10/06 709/203 |
| 2012/0110570 | A1* | 5/2012 | Jacobson | G06F 9/45533 718/1 |
| 2012/0110650 | A1* | 5/2012 | Van Biljon | G06Q 40/00 726/4 |
| 2012/0124211 | A1* | 5/2012 | Kampas | G06F 9/50 709/226 |
| 2012/0131591 | A1* | 5/2012 | Moorthi | G06Q 10/06 718/104 |
| 2012/0159424 | A1* | 6/2012 | Shukla | G06F 8/34 717/103 |
| 2012/0254443 | A1* | 10/2012 | Ueda | H04L 67/1008 709/226 |
| 2012/0284637 | A1* | 11/2012 | Boyer | G06Q 10/109 715/751 |
| 2012/0290460 | A1* | 11/2012 | Curry, Jr. | H04L 41/5029 705/37 |
| 2013/0019013 | A1 | 1/2013 | Rice et al. | |
| 2013/0159380 | A1 | 6/2013 | Alam | |
| 2013/0246606 | A1* | 9/2013 | Branch | H04L 41/0853 709/224 |
| 2013/0304923 | A1 | 11/2013 | Clay et al. | |
| 2013/0346946 | A1 | 12/2013 | Pinnix | |
| 2014/0040975 | A1* | 2/2014 | Raleigh | H04W 12/12 726/1 |
| 2014/0108483 | A1 | 4/2014 | Tarta et al. | |
| 2014/0173520 | A1 | 6/2014 | Sheha et al. | |
| 2014/0200947 | A1* | 7/2014 | Gujar | G06Q 30/0631 705/7.26 |
| 2014/0214496 | A1* | 7/2014 | Macbeath | G06Q 30/0283 705/7.37 |
| 2014/0258446 | A1* | 9/2014 | Bursell | G06F 15/177 709/217 |
| 2014/0304352 | A1* | 10/2014 | Chaudhary | G06F 9/5011 709/208 |
| 2014/0317293 | A1* | 10/2014 | Shatzkamer | G06F 9/45558 709/226 |
| 2015/0039768 | A1* | 2/2015 | Matczynski | H04L 41/0896 709/226 |
| 2015/0263902 | A1* | 9/2015 | He | H04L 41/145 709/226 |
| 2015/0264035 | A1 | 9/2015 | Waterhouse et al. | |
| 2015/0288590 | A1* | 10/2015 | Mason | H04L 67/1027 709/224 |
| 2015/0304237 | A1* | 10/2015 | Yip | H04L 47/781 709/225 |
| 2015/0326579 | A1* | 11/2015 | Chandwani | H04L 63/10 709/225 |
| 2016/0094410 | A1* | 3/2016 | Anwar | H04L 67/1095 709/223 |
| 2016/0105311 | A1* | 4/2016 | Thakkar | H04L 41/0813 709/222 |
| 2016/0105488 | A1* | 4/2016 | Thakkar | H04L 67/10 709/217 |
| 2016/0171682 | A1 | 6/2016 | Abedini et al. | |
| 2016/0182336 | A1* | 6/2016 | Doctor | H04L 43/062 709/224 |
| 2016/0188360 | A1 | 6/2016 | Allen | |
| 2017/0199766 | A1 | 7/2017 | Wagner et al. | |

OTHER PUBLICATIONS

Office Action dated Feb. 13, 2020 for U.S. Appl. No. 15/807,127, 20 pages.
Notice of Allowance dated May 14, 2020 for U.S. Appl. No. 15/807,127, 13 pages.

* cited by examiner

DEFERENTIAL SUPPORT OF REQUEST DRIVEN CLOUD SERVICES

BACKGROUND

Technical Field

The present invention relates generally to cloud computing and, in particular, to deferential support of request driven cloud services.

Description of the Related Art

In a bare-metal cloud environment, a set of servers are provided for rental to the customers as needed. In order to deal with customer demands, the provider of such a cloud environment maintains a surplus number of servers. Invariably, at any time, there are servers which are in excess, i.e., not being used by a paying customer. These cloud providers would like to make money off the excess servers by running services on them.

SUMMARY

According to an aspect of the present invention, a computer-implemented method is provided for, in turn, providing software as a service for a request oriented application. The method includes configuring, by at least one processor, a set of worker services to operate in a stateless manner. The method further includes providing, by the at least one processor, a set of support services that enable the set of worker services to operate in the stateless manner. The support services include (i) a management service for providing notifications of server removal and server addition (ii) a state maintenance service for maintaining state information in a central location, and (iii) a load balancer service for distributing requests among different Ones of the worker services. The method also includes altering, by the at least one processor, a number of servers allocated to at least one of the worker services, responsive to a notification from the management service. A private protocol is used between the worker services, and the load balancer service (a) to send, from the worker services to the load balancer service, a respective pointer to the state information associated with the requests, and (b) to include the respective pointer in the requests when any of the requests are forwarded to any of the worker services in the set.

According to another aspect of the present invention, a computer program product is provided for, in turn, providing software as a service for a request oriented application. The computer program product includes a non-transitory computer readable storage medium having program instructions embodied therewith. The program instructions are executable by a computer to cause the computer to perform a method. The method includes configuring, by at least one processor, a set of worker services to operate in a stateless manner. The method further includes providing, by the at least one processor, a set of support services that enable the set of worker services to operate in the stateless manner. The support services include (i) a management service for providing notifications of server removal and server addition, (ii) a state maintenance service for maintaining state information in a central location, and (iii) a load balancer service for distributing requests among different ones of the worker services. The method also includes altering, by the at least one processor, a number of servers allocated to at least one of the worker services, responsive to a notification from the management service. A private protocol is used between the worker services and the load balancer service (a) to send, from the worker services to the load balancer service, a respective pointer to the state information associated with the requests, and (b) to include the respective pointer in the requests when any of the requests are forwarded to any of the worker services in the set.

According to yet another aspect of the present invention, a computer processing system is provided for, in turn, providing software as a service for a request oriented application. The system includes at least one processor. The at least one processor is configured to configure a set of worker services to operate in a stateless manner. The at least one processor is further configured to provide a set of support services that enable the set of worker services to operate in the stateless manner. The support services include (i) a management service for providing notifications of serer removal and server addition, (ii) a state maintenance service for maintaining state information in a central location, and (iii) a load balancer service for distributing requests among different ones of the worker services. The at least one processor is also configured to alter a number of servers allocated to at least one of the worker services, responsive to a notification from the management service. A private protocol is used between the worker services and the load balancer service (a) to send, from the worker services to the load balancer service, a respective pointer to the state information associated with the requests, and (b) to include the respective pointer in the requests when any of the requests are forwarded to any of the worker services in the set.

These and other features and advantages will become apparent from the following detailed description of illustrative embodiment thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
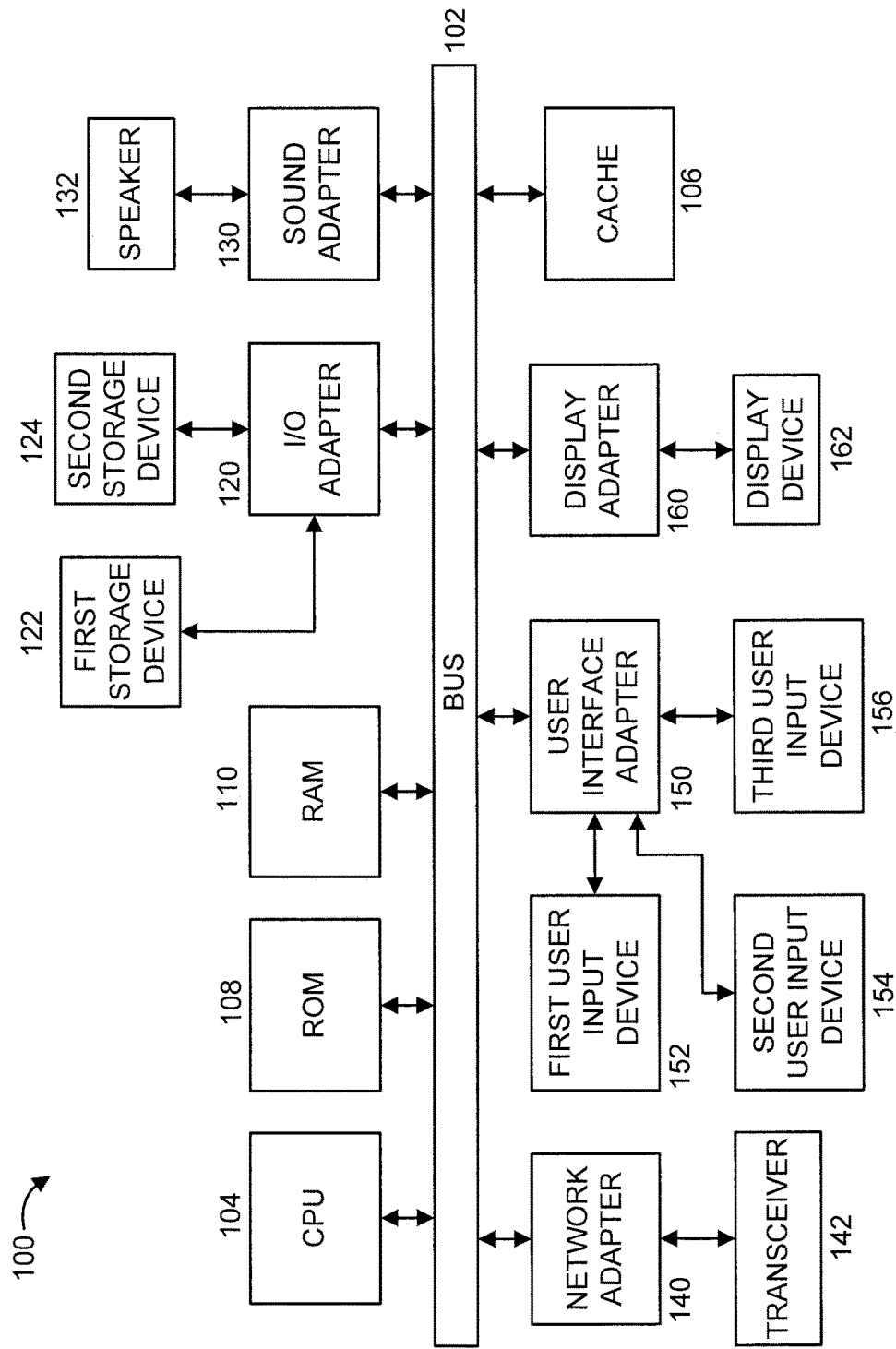
FIG. 1 shows an exemplary processing system to which the present invention may be applied, in accordance with an embodiment of the present invention.

The present invention is directed to deferential support of request driven cloud services.

In an embodiment, the present invention provides a set of offerings by which excess servers in a cloud environment can be monetized. In order to be monetized, new software services are offered using the excess services. However, since the services can lose the underlying infrastructure very quickly, they have to be designed specially in order to be offered. We refer to this class of services as deferential service, i.e., services which defer their infrastructure to other services/workload as needed.

Deferential Services can be of one of two types, namely (i) a request-driven deferential service (hereinafter "request-driven service" in short) or (ii) a continual deferential service (hereinafter "continual service" in short). Request driven services are ones which perform some set of actions when a request is received from a user, e.g., a Domain Name Service (DNS) receives a name request and returns a response back. Continual services are those which result in tasks that are long running, e.g. one may take a set of video images and transcode them into different formats, or a task which runs an analysis job on a large set of network call data records and so forth. A continuous service can be emulated by using an internal client which makes a succession of requests to initiate the continuous service, and the mechanisms described herein can be used for continuous services as well. The preceding services mentioned with respect to request-drive services and continual services are merely illustrative and, thus, one of ordinary skill in the art will contemplate these and other types of each of these services to which the present principles can be applied while maintaining the spirit of the present invention.

In an embodiment, the present invention provides a set of protocols which can be used to efficiently implement deferential services model for request driver cloud services.

The main challenge in making a system deferential is the fact that operating systems maintain state required for connections to a client when using connection oriented protocols. TCP or Transmission Control Protocol is the most commonly used connection oriented protocol in the Internet. The present invention addresses this challenge by enabling stateless worker services even when a user connection needs to be maintained over a connection oriented protocol like TCP.

Request oriented deferential services are supported using a load balancer which distributes the message to several worker services. If the worker services maintain state, they cannot give up the virtual machine or server easily. In order to provide a deferential mode of operation, each of the worker services needs to be made stateless. The main idea in making the system deferential is to transfer the task of TCP connection maintenance to the load balancer, and to introduce a private protocol between the load balancer and the worker services which enables the worker services to become stateless.

An advantage of the present invention is that connection oriented services can be made to run with stateless worker services with only application level mechanisms, and there is no need to use complex Virtual Machine (VM) migration or TCP state migration mechanisms to offer deferential services.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150 and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
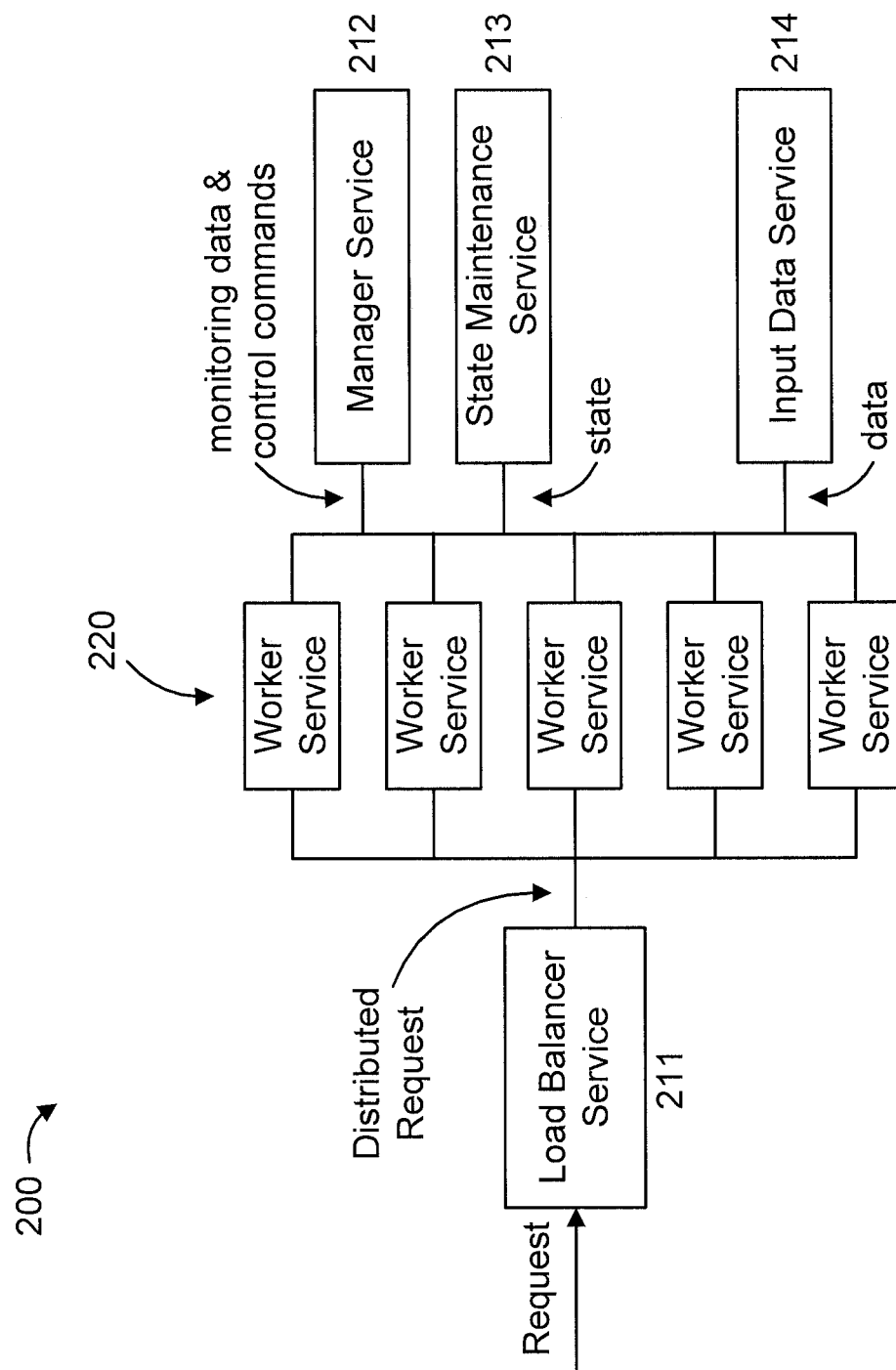
FIG. 2 shows an exemplary system for deferential support of request driven cloud services, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
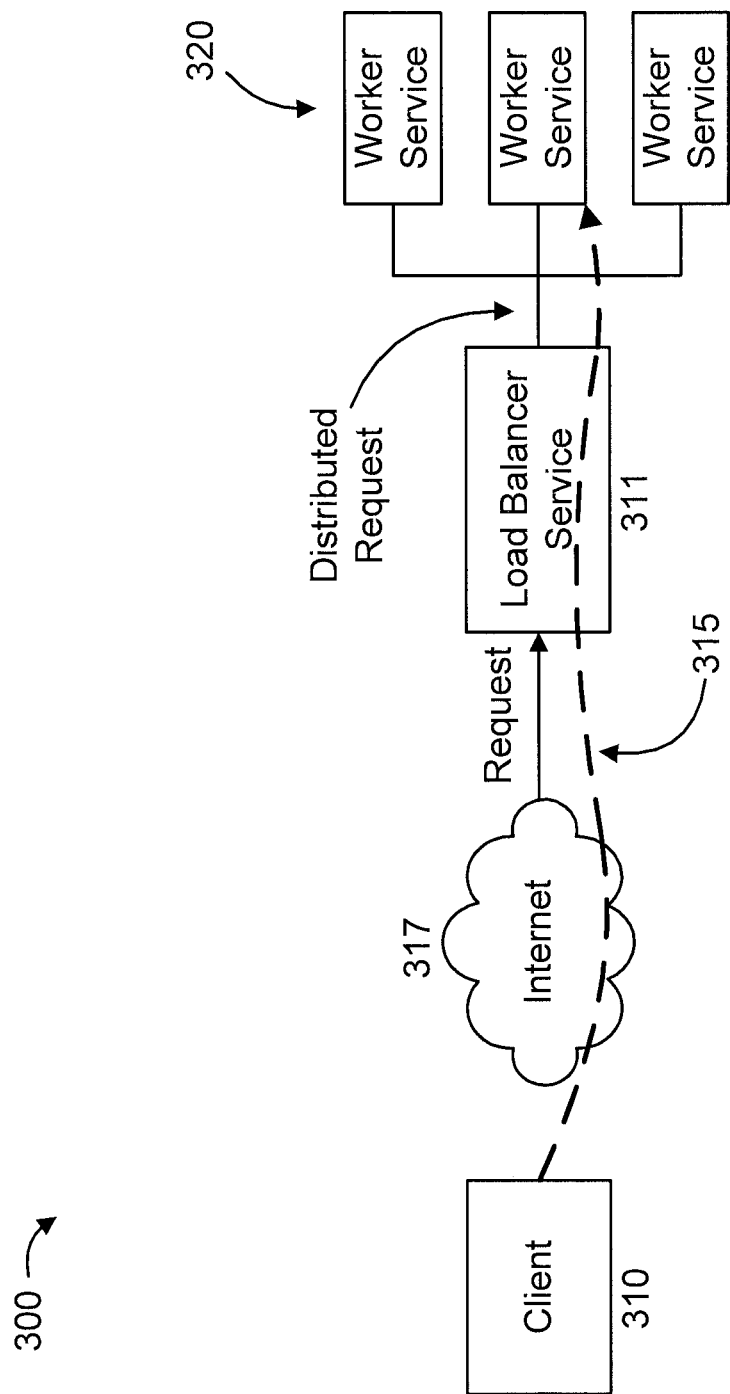
FIG. 3 shows an exemplary setup for an established TCP connection for a client to which the present invention can be applied, in accordance with an embodiment of the present invention.

Moreover, it is to be appreciated that setup 300 described below with respect to FIG. 3 is a setup to which the present invention can be applied. Part or all of processing system 100 may be implemented in one or more of the elements of setup 300.

Figure 4:
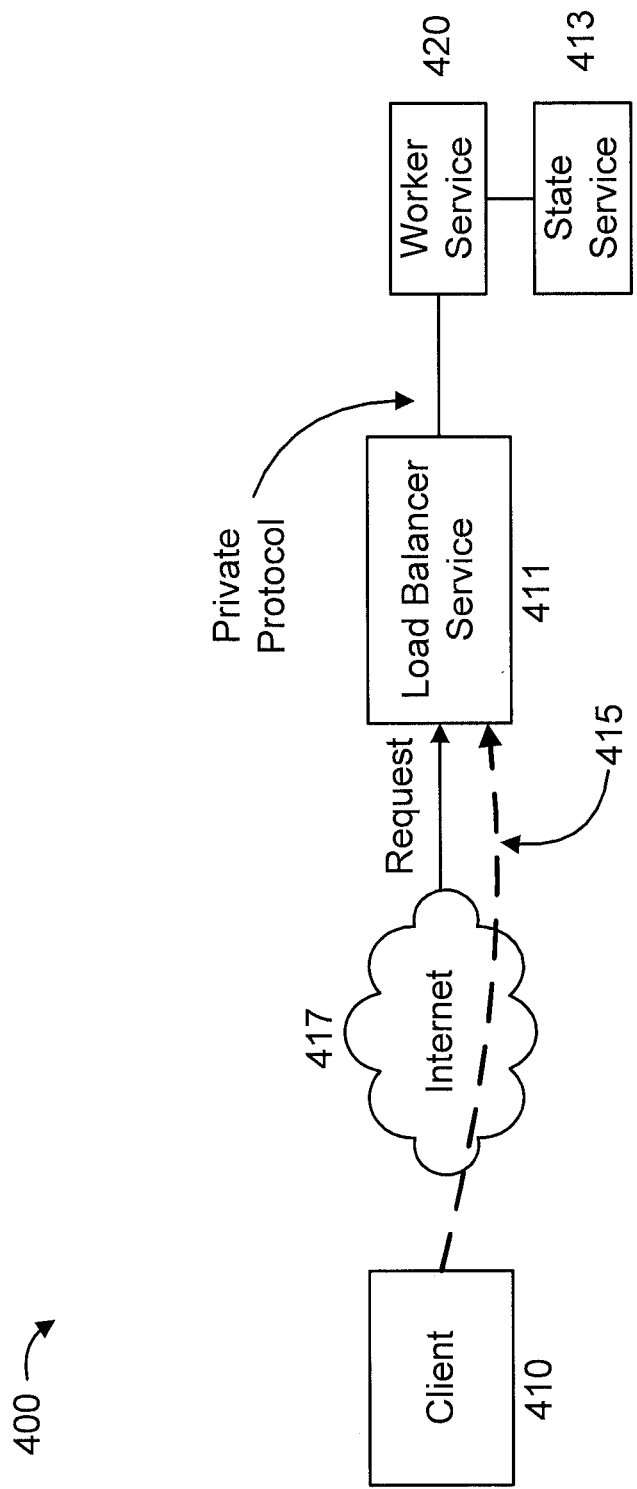
FIG. 4 shows an exemplary setup for an established TCP connection for a client, in accordance with an embodiment of the present invention.

Also, it is to be appreciated that setup 400 described below with respect to FIG. 4 is a setup for implementing respective embodiments of the present invention. Part or all of processing system 100 may be implemented in one or more of the elements of setup 400.

Figure 5:
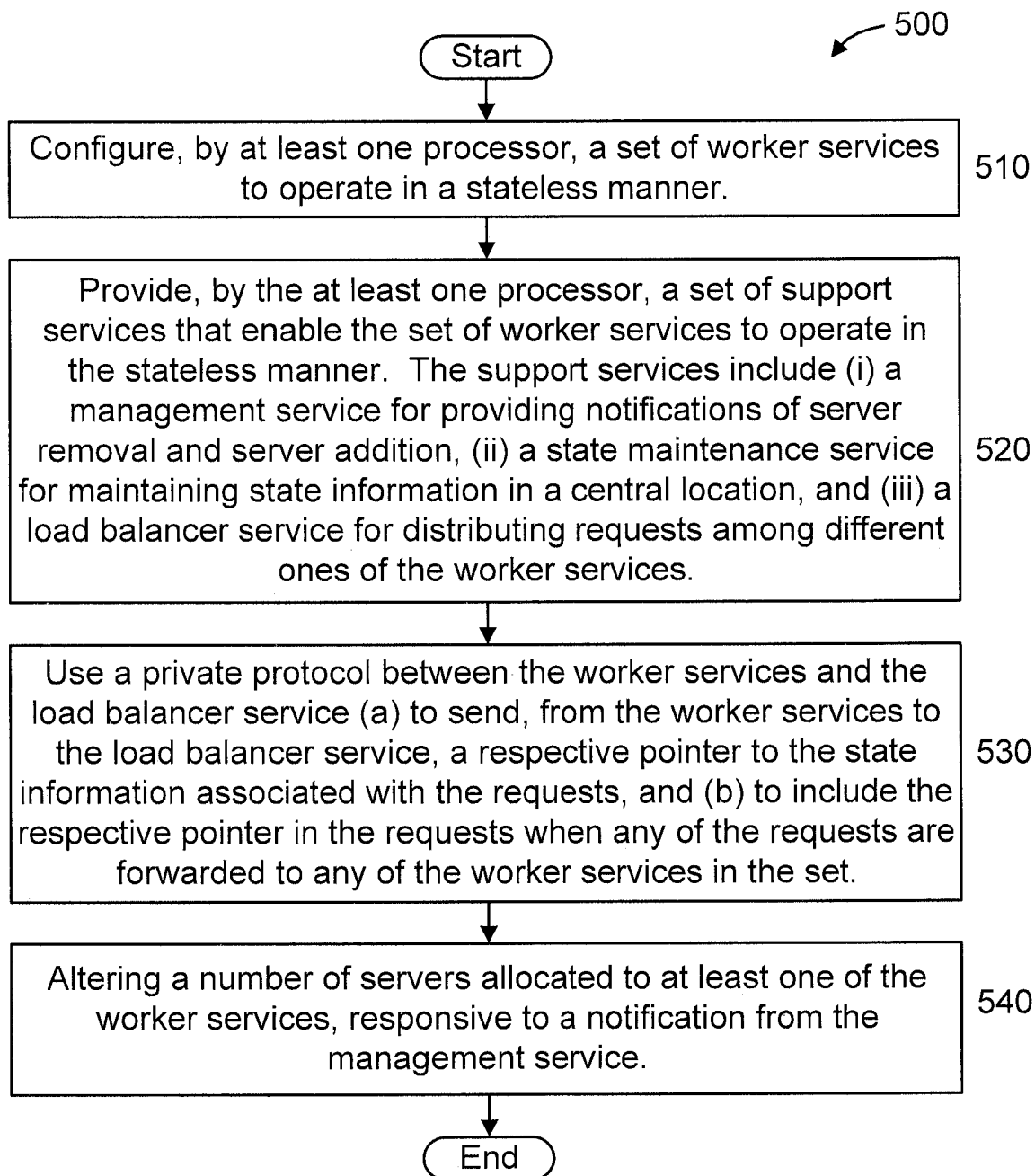
FIG. 5 shows an exemplary method for deferential support of request driven cloud services, in accordance with an embodiment of the present invention.

Further, it is to be appreciated that processing system 100 may perform at least part of the method described herein including, for example, at least part of method 500 of FIG. 5. Similarly, part or all of system 200 may be used to perform at least part of method 500 of FIG. 5. Also, part or all of setup 400 may be used to perform at least part of method 500 of FIG. 5.

FIG. 2 shows an exemplary system 200 for deferential support of request driven cloud services, in accordance with an embodiment of the present invention.

The architecture 200 is used to offer a request driven service model.

The architecture 200 includes a load balancer service 211 for receiving a request and distributing the request as a distributed request to an application 220.

Each application 220 is structured into a set of worker services (and, hence, the reference numeral 220 denotes both the application and any of worker services in the set into which the application is structured) that need to run in a stateless manner. A set of support services, which run as normal cloud services on one or more bare metal servers, enable the operation of the worker services.

In order to run a request driven service in a deferential model, we use four support services 210, namely a manager service 212, a state maintenance service 213, an input data service 214, and the aforementioned load balancer service 211.

The manager service 212 interfaces with the operational management system of the cloud service provider. The manager service 212 receives notification from the cloud service provider as to whether a server is being taken away or being made available to the pool of worker services. The manager service 212 provides the task of monitoring the worker services, starting new worker services on any extra server that is made available, and for stopping a worker service when its server needs to be taken away. The worker service can be given a signal that it needs to stop working when the server is taken away. Hence, the manager service 242 receives monitoring data and control commands.

The state maintenance, service 213 provides a mechanism to store the state for all of the worker services.

The input data service 214 is a system that maintains all the read-only information (data) required by a service Worker services need to maintain all their application state into the state maintenance service 213.

The load balancer service 211 receives requests from the external clients and asks one of the worker services to work with that. The manager service 212 keeps track of the status of each of the worker service, and informs the load balancer 211 of the set of currently active worker services. The load balancer service 211 can then distribute any incoming request to be handled by one of the worker services.

In the embodiment shown in FIG. 2, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIG. 3 shows an exemplary setup 300 for an established TCP connection for a client to which the present invention can be applied, in accordance with an embodiment of the present invention.

The setup 300 involves a client 310 initiating a TCP connection (also interchangeably referred to "TCP session") 315 with an application 320 over the Internet 317 (or other network) and using a load balancer server 311. The application 320 is implemented by a set of worker services (also singularly and collectively referred to by the figure reference numeral 320).

A desired aspect of the operation is that the worker services 320 should be able to work on an unmodified or standard operating system. In many request oriented services, the worker service 320 needs to maintain a TCP connection 315 with a client 310. The TCP connection 315 is maintained by the operating system, and requires maintaining state in the kernel. Examples of information maintained as state in the TCP connection 315 by the operating system include the sequence number of packets being transmitted, the negotiated window for flow control with the client 310, the dynamically changing congestion window, and so forth. If the information about the state is not maintained properly, the client 310 may terminate the connection. This can cause a problem for the application 320 since whenever a server is lost, the client 310 will see the connection being disrupted.

While there are mechanisms to transfer TCP state to another Operating System (OS) for high availability, including mechanisms to move an entire Virtual Machine (VM) over, such mechanisms tend to be relatively heavy weight and require complex modifications or enhancements to the operating system.

FIG. 4 shows an exemplary setup 400 for an established TCP connection for a client, in accordance with an embodiment of the present invention.

The setup 400 involves a client 410 initiating a TCP connection (also interchangeably referred as "TCP session") 415 with an application 420 over the Internet 417 (or other network) and using a load balancer server 411. The application 420 is implemented by a set of worker services (also singularly and collectively referred to by the figure reference numeral 320).

The present invention is able to take an application level service and make it run in a deferential manner without OS level modifications. In order to do so, the following changes are made:

1. Each worker service 420 is modified so that all of its application level state is stored in the state maintenance service (also referred to herein as "state service" in short) 413.
2. Each state information is referenced by a pointer or index that the state maintenance service 413 can provide to the worker service 420.
3. A private protocol is used between the worker service 420 and the load balancer 411. In this private protocol, the worker service 420 provides a pointer to the load balancer service 411 for the state information, which itself is maintained in the state maintenance service 413.
4. The TCP connection 415 with the client 410 is terminated at the load balancer service 311. The load balancer service 311 can send the request coming on a TCP connection to any of the worker service 420. When the request is forwarded, the pointer to state information is passed along with the request to the worker services 420.
5. Each worker service 420 picks up the processing of the request by reading the state from the state maintenance service 413.

The state pointer is associated by the load balancer service 411 with each TCP session. The state pointer can also be associated with a finer granularity for some applications.

This mechanism allows the worker service 420 to be changed dynamically as the TCP session is no longer maintained. The application level state is maintained in the state maintenance service 413, which can be made stateless.

Since worker services 420 may be caching state from the state maintenance service 413, with write-through mechanisms for updating state, it would be beneficial for the load balancer service 411 to direct requests to the same worker service 420 whenever possible on the same connection.

While we have described the above in the terms of a cloud service provider offering bare metal servers, the same paradigm applies to other cloud providers offering infrastructure services, including hut not limited to, infrastructure services provided as virtual machines, light-weight containers, or other similar abstractions.

In the embodiment shown in FIG. 4, at least one of the elements of setup 400 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements in FIG. 4 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of setup 400 are readily determined by one of ordinary skill in the art, given the teachings of the present invention provided herein, while maintaining the spirit of the present invention.

FIG. 5 shows an exemplary method 500 for deferential support of request driven cloud services, in accordance with an embodiment of the present invention. The deferential support involves providing software as a service for a request oriented application.

At step 510, configure, by at least one processor, a set of worker services, to operate in a stateless manner.

At step 520, provide, by the at least one processor, a set of support services that enable the set of worker services to operate in the stateless manner. The support services include (i) a management service for providing notifications of server removal and server addition, (ii) a state maintenance service for maintaining state information in a central location, and (iii) a load balancer service for distributing requests among different ones of the worker services.

At step 530, use a private protocol between the worker services and the load balancer service (a) to send, from the worker services to the load balancer service, a respective pointer to the state information associated with the requests and (b) to include the respective pointer in the requests when any of the requests are forwarded to any of the worker services in the set. The private protocol may be implemented, for example, using either a SOA (Service Oriented Architecture) paradigm, a REST (Representational State Transfer) interface, built natively over sockets, or any other approaches, while maintaining the spirit of the present invention.

At step 540, altering a number of servers allocated to at least one of the worker services, responsive to a notification from the management service. For example, step 540 can involve removing and/or adding a server from and/or to selected ones the worker services, responsive to one or more notifications from the management service. Thus, in an embodiment, step 540 can involve reconfiguring one or more pools of servers with, for example, each pool corresponding to a particular worker service. In an embodiment, removing a server from a worker service can involve powering down the server or allocating the server to another worker service, while adding a server can involve powering up the server or reallocating a server from another worker service to the worker service. These and other types of resource allocations are readily contemplated by one of ordinary skill in the art given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with management effort or interaction with a provider of the service. This cloud model may include at least live characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage, can be monitored, controlled, and reported, providing transparency for both the provider and consumer of the utilized service.

Service Models are as follows:

Software as a Service (SaaS): the capability provided to the consumer is to use the provider's application s running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
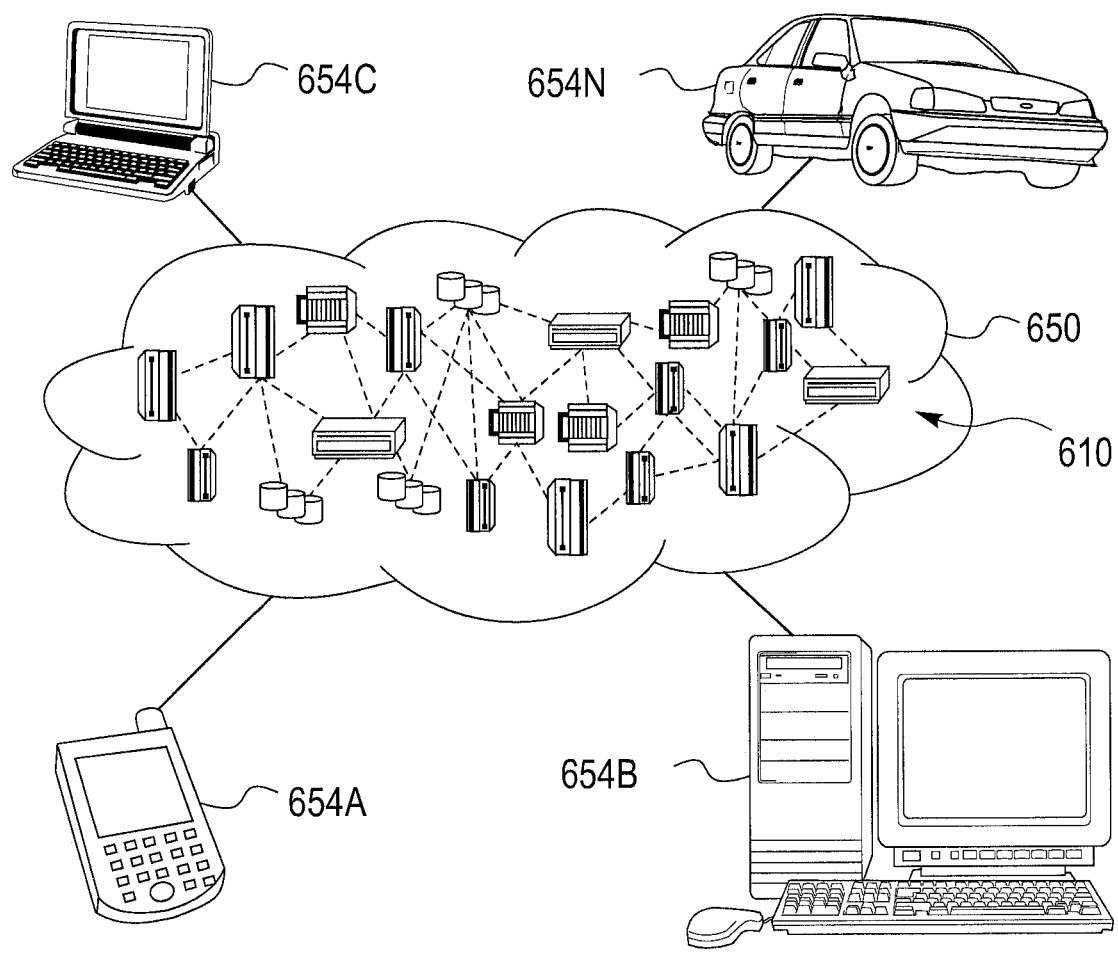
FIG. 6 shows an exemplary cloud computing environment, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
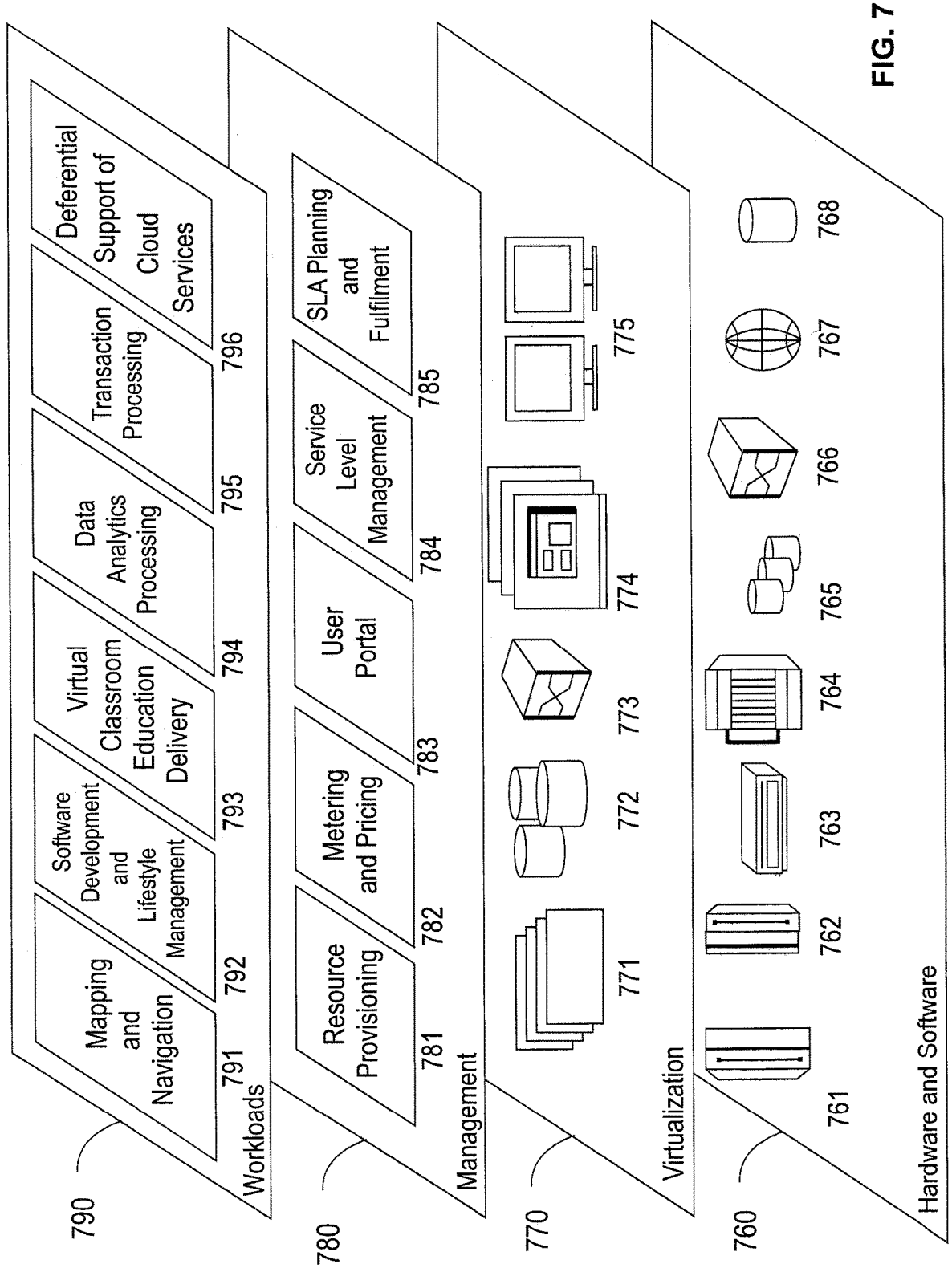
FIG. 7 shows an exemplary set of functional abstraction layers provided by the cloud computing environment shown in FIG. 6, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual, applications and operating systems 774; and virtual clients 775.

In one example, management layer 780 may provide the functions, described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and deferential support of request driven cloud services 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media e.g., light pulses passing through a fiber-optic cable), or electrical signals transmitted through a wire.

Computer readable program instructions described herein can be downloaded to respective computing/processing devices from a computer readable storage, medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B. and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details, and particularity required by the patent laws, what is claimed and desired protected by Letters Patent is set forth in the appended claims.

The invention claimed is:

1. A computer-implemented method for providing software as a service for a request oriented application, the method comprising:

configuring, by at least one processor, a set of worker services to operate in a stateless manner;

providing, by the at least one processor, a set of support services that enable the set of worker services to operate in the stateless manner, the support services including (i) a management service for providing notifications of server removal and server addition, (ii) a state maintenance service for maintaining state information in a central location, and (iii) a load balancer service for distributing requests among different ones of the worker services; and altering, by the at least one processor, a number of servers allocated to at least one of the worker services, responsive to a notification from the management service, wherein a private protocol is used between the worker services and the load balancer service (a) to send, from the worker services to the load balancer service, a respective pointer to the state information associated with the requests, and (b) to include the respective pointer in the requests when any of the requests are forwarded to any of the worker services in the set, further comprising terminating, by the load balancer server, a Transfer Control Protocol (TCP) connection between a client and at least some of the worker services while maintaining the state information of the TCP connection for use by a replacement non-TCP connection selectively made between the client and the at least some of the worker services or between the client and other ones of the worker services, the TCP connection and the replacement non-TCP connection corresponding to a same one of the requests, wherein the worker services are initially configured as stateful worker services prior to said configuring step.

2. The computer-implemented method of claim 1, wherein each of the worker services is configured to use a respective set of servers that is modifiable by set altering step.

3. The computer-implemented method of claim 1, wherein said altering step adds at least one server to a pool of servers used by the at least one of the worker services.

4. The computer-implemented method of claim 1, wherein said altering step removes at least one server from a pool of servers used by the at least one the worker services.

5. The computer-implemented method of claim 1, wherein the load balancer service is configured to initially try a same one of the worker services to meet a particular one of the requests on a same connection before trying any other ones of the worker services.

6. The computer-implemented method of claim 1, further comprising structuring an application as the set of worker services.

7. The computer-implemented method of claim 1, further comprising terminating, by the load balancer server, a Transfer Control Protocol (TCP) connection between a client and at least some of the worker services and replacing the TCP connection with a non-TCP connection using the private protocol.

8. The computer-implemented method of claim 1, further comprising terminating, by the load balancer server, a Transfer Control Protocol (TCP) connection between a client and at least some of the worker services while maintaining the state information of the TCP connection for use by a replacement non-TCP connection selectively made between the client and the at least some of the worker services or between the client and other ones of the worker services, the TCP connection and the replacement non-TCP connection corresponding to a same one of the requests.

9. The computer-implemented method of claim 1, wherein a given one the worker services, when newly assigned to a given one of the requests, commences processing the given one of the requests by reading the state information therefor.

10. The computer-implemented method of claim 1, wherein the state information comprises an item selected from the group consisting of a packet sequence number, a negotiated window for flow control, and a dynamically changing congestion window.

11. The computer-implemented method of claim 1, wherein the state information has a granularity below an application-level granularity.

12. The computer-implemented method of claim 1, wherein the software as a service is provided in a cloud computing environment that structures applications into respective sets of worker services, and a respective pool of servers is allocated to each of the worker services.

13. The computer-implemented method of claim 1, wherein the state information comprises a sequence number of packets being transmitted.

14. The computer-implemented method of claim 1, wherein the state information comprises a negotiated window for flow control with a client.

15. The computer-implemented method of claim 1, wherein the state information comprises a dynamically changing congestion window.

* * * * *